United States Patent Office 2,987,525
Patented June 6, 1961

2,987,525
SYNTHESIS OF POLYCYCLIC HETEROCYCLIC COMPOUNDS
Joseph T. Arrigo, Broadview, Ill., assignor, by mesne assignments, to Universal Oil Products Company, Des Plaines, Ill., a corporation of Delaware
No Drawing. Filed Oct. 29, 1958, Ser. No. 770,268
10 Claims. (Cl. 260—345.2)

This invention relates to a process for preparing polycyclic heterocyclic compounds and particularly to a process for synthesizing chromenes. More particularly the invention is concerned with a novel process for preparing chromenes by alkylating a hydroxybenzaldehyde.

An object of this invention is to provide a novel method for preparing polycyclic heterocyclic compounds containing an oxygen atom in one of the rings.

A further object of this invention is to provide a process for preparing chromenes containing various substituents on the rings.

One embodiment of the invention is found in a process for preparing a chromene by condensing a salicylaldehyde with an alkylating agent in the presence of an acid-acting catalyst at alkylating conditions and recovering the resultant chromene.

A further embodiment of this invention resides in a process for the preparation of a chromene which comprises condensing a salicylaldehyde with an alkylating agent in an inert organic diluent in the presence of an acid-acting catalyst at a temperature in the range of from about 0° to about 200° C. and recovering the resultant chromene.

A still further embodiment of the invention resides in a process for the preparation of a chromene which comprises condensing a salicylaldehyde with a trisubstituted olefin in the presence of n-heptane in the presence of an acid-acting catalyst at a temperature in the range of from about 0° to about 200° C. and recovering the resultant chromene.

A specific embodiment of the invention resides in a process for the preparation of a chromene which comprises condensing salicylaldehyde with isoamylene in n-heptane in the presence of a catalyst comprising a zinc chloride-alumina mixture at a temperature in the range of from about 125° to about 175° C. and recovering the resultant 2,2,3-trimethyl-3-chromene.

Other objects and embodiments referring to alternative alkylating agents, inert organic diluents, salicylaldehydes and acid-acting catalysts will be found in the following further detailed description of the invention.

Polycyclic heterocyclic compounds containing an oxygen atom in one of the rings and which may contain alkyl, alkoxy or halogen substituents on one or both of the rings may be prepared by alkylating a hydroxybenzaldehyde such as o-hydroxybenzaldehyde (salicylaldehyde) with an alkylating agent such as an olefin or an alkyl halide in the presence of a moderately strong acid-acting catalyst at alkylating conditions. The chromenes thus formed may be used as intermediates in the preparation of other organic chemicals. For example, the chromene thus produced may be condensed at the active double bond with a polyhalo substituted alkadiene or cycloalkadiene such as 1,2-dichloro-1,3-butadiene or hexachlorocyclopentadiene to yield a tricyclic or tetracyclic halogenated compound which is active as an insecticide. In addition the double bond may be hydrated to yield the corresponding chromanol which may then be further condensed with other alkylating agents. Furthermore, the chromenes may also be used as intermediates in the preparation of indanols which are useful as antioxidants or antiozonants.

As hereinbefore set forth chromene or polysubstituted chromenes may be prepared according to the following equation:

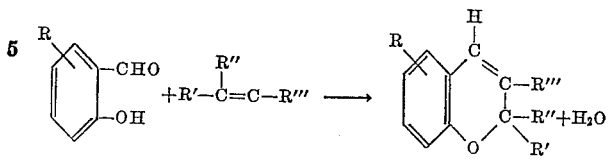

in which R is a hydrogen, alkyl, alkoxy or halogen radical, R' and R" comprises alkyl groups containing from 1 to about 5 carbon atoms and R''' comprises hydrogen or an alkyl radical containing from 1 to about 4 carbon atoms. Examples of o-hydroxybenzaldehydes which may be used include o-hydroxybenzaldehyde (salicylaldehyde), 3-methylsalicylaldehyde, 3-ethylsalicyclaldehyde, 4 - methylsalicylaldehyde, 5 - methylsalicylaldehyde, 5-ethylsalicylaldehyde, 6 - methylsalicylaldehyde, 6 - ethylsalicylaldehyde, etc., 3 - chlorosalicylaldehyde, 4 - chlorosalicyclaldehyde, 5 - chlorosalicylaldehyde, 6 - chloro salicylaldehyde, 4-bromosalicylaldehyde, 5-bromosalicylaldehyde, 6 - bromosalicylaldehyde, 3 - methoxysalicylaldehyde, 3 - methoxysalicyclaldehyde, 4 - methoxysalicylaldehyde, 5-methoxysalicylaldehyde, 6-methoxysalicylaldehyde, 3-ethoxysalicylaldehyde, 4 - ethoxysalicylaldehyde, 5-ethoxysalicylaldehyde, 6 - ethoxysalicylaldehyde, 3-propoxysalicylaldehyde, 4 - propoxysalicylaldehyde, 5 - propoxysalicylaldehyde, 6-propoxysalicylaldehyde, etc.

Examples of olefins which may be used comprise those olefins which contain a tri-substituted carbon atom or are capable of isomerizing to such configuration under the reaction conditions and include isobutylene, isoamylene, 2-methyl-1-hexene, 2-methyl-1-heptene, 2-ethyl-1-hexene, 2-ethyl-1-heptene, 2-propyl-1-hexene, 2-propyl-1-heptene, 2-butyl-1-hexene, 2-butyl-1-heptene, 3-methyl-2-pentene, 3 - methyl - 2 - hexene, 3 - methyl - 2 - heptene, 2 - ethyl-2 - pentene, 3 - ethyl - 2 - hexene, 3 - ethyl-2-heptene, 2-propyl-2-pentene, 3-propyl-2-hexene, 3-propyl-2-heptene, 3 - methyl - 3 - hexene, 3 - methyl-3-heptene, 3-methyl-3-octene, 3-ethyl-3-hexene, 3 - ethyl - 3 - heptene, 3-ethyl-3-octene, 3-propyl-3-hexene, 3-propyl-3-heptene, 3-propyl-3-octene, 3-butyl-3-hexene, 3-butyl-3-heptene, 3-butyl- 3-octene, etc. It is to be understood that the aforementioned salicylaldehydes and olefinic hydrocarbons containing the above mentioned configuration are only representatives of the class of compounds which may be used and that the present invention is not necessarily limited thereto.

It is also contemplated within the scope of this invention that other alkylating agents may be used in the condensation process with the salicylaldehyde. Examples of other alkylating agents which may be used include the bromides, chlorides and iodides of tertiary aliphatic compounds such as t-butyl chloride, t-butyl bromide, t-butyl iodide, t-pentyl chloride, t-pentyl bromide, t-pentyl iodide, t-hexyl chloride, t-hexyl bromide, t-hexyl iodide, t-heptyl chloride, t-heptyl bromide, t-heptyl iodide, t-octyl chloride, t-octyl bromide, t-octyl iodide, t-nonyl chloride, t-nonyl bromide, t-nonyl iodide, t-decyl chloride, t-decyl bromide, t-decyl iodide, etc.

The reaction may, if so desired, take place in the presence of an inert organic diluent or solvent, said diluents including saturated aliphaitc and cycloaliphatic hydrocarbons such as n-pentane, n-hexane, n-heptane, etc., cyclopentane, cyclohexane, cycloheptane, methylcyclopentane, ethylcyclopentane, etc.; halogenated aliphatic compounds such as chloroform, bromoform, iodoform, etc. In additon the reaction is effected in the presence of moderately strong acid-acting catalysts, said catalysts including but not necessarily limited to silica-alumina, zinc chloride, a zinc chloride-alumina catalyst, boron trifluoride-alumina catalyst, boron trifluoride-phosphoric acid complex, phosphoric acid, a phosphoric-fluoboric acid catalyst, etc. The reaction is effected at varying temperatures, said temperature depending upon the particular catalyst which is chosen as well as the reactants and will take place in the range of from about 0° to about 200° C. In addition if higher temperatures are used it may become necessary to also use superatmospheric pressures ranging from about 2 to about 100 atmospheres or more, the amount of pressure being that required to maintain a substantial portion of the reactants in the liquid phase.

The process of the present invention may be effected in any suitable manner and may comprise either a batch or a continuous type operation. For example, when a batch type operation is used a quantity of the starting materials comprising the particular alkylating agent chosen and the salicylaldehyde is placed in an appropriate apparatus along with the desired catalyst and the inert organic diluent. The condensation apparatus which is used may comprise a condensation flask provided with the necessary heating and stirring means if the reaction is to proceed at a relatively low temperature or a rotating autoclave if the reaction is to proceed at higher temperatures and therefore, by necessity, higher pressures. The apparatus and contents thereof are heated to the desired temperature and maintained thereat for a predetermined residence time, at the end of which time the apparatus and contents thereof are allowed to cool to room temperature. The reaction product is separated from the catalyst layer and subjected to fractional distillation after having been treated by conventional means such as washing, drying, alkali extraction, etc., whereby the desired chromene or substituted chromene is separated from any unreacted salicylaldehyde and side reaction products and recovered.

The process of the present invention may also be effected in a continuous type operation. When using acid-acting catalysts which are solid in nature the preferred type of operation comprises a fixed bed method. In this method the catalyst such as silica-alumina, zinc chloride-alumina, etc., is disposed as a fixed bed in a reaction zone which is maintained at the proper operating conditions of temperature and pressure. The starting materials comprising the particular salicylaldehyde or substituted salicylaldehyde and the alkylating agent are continuously charged to the reactor through separate lines at a liquid hourly space velocity ranging from about 0.1 to about 20 or more, the preferred range being from about 0.1 to about 10 (the liquid hourly space velocity is defined as the volume of reactant charged per volume of catalyst per hour). The inert organic diluent in which the reaction proceeds may also be charged through a separate line or, if so desired, may be admixed with one or both of the reactants before entry into said reactor and charged thereto in a single stream. Upon completion of the desired residence time the reaction product is continuously withdrawn and separated from the reactor effluent, the latter being recycled to form a portion of the feed stock while the former is separated and purified by conventional means hereinbefore set forth.

Other types of continuous operation which may be used in this process include the moving bed type of operation in which the catalyst and the reactants pass either concurrently or countercurrently to each other in the reaction zone and the slurry type operation in which the catalyst is carried into the reactor as a slurry in one of the reactants.

The following examples are given to illustrate the process of the present invention, which, however, are not intended to limit the generally broad scope of the present invention in strict accordance therewith.

*Example I*

In this experiment 61 g. (0.50 mole) of salicylaldehyde and 53 g. (0.50 mole) of t-pentyl chloride along with 21 g. of fused zinc chloride catalyst and 300 ml. of chloroform were placed in a flask. The flask is heated at a temperature of about 70–80° C. over the course of about 7 hours. At the end of this time the flask and contents thereof were allowed to cool to room temperature and the reaction product separated from the catalyst layer. The former was washed, dried and subjected to fractional distillation, the cut boiling chiefly at 80–81° C. at 2.1 mm. comprising 2,2,3-trimethyl-3-chromene being separated therefrom.

*Example II*

A mixture of 51 g. (0.42 mole) of salicylaldehyde and 33.4 g. (0.47 mole) of isoamylene along with 60 g. of n-heptane and 6.1 g. of a zinc chloride-alumina catalyst was placed in a glass liner of a rotating autoclave. The liner was sealed into the autoclave and heated to a temperature of about 150° C. The autoclave was maintained at this temperature for a period of about 4 hours at the end of which time the autoclave and contents thereof were allowed to cool to room temperature. The autoclave was opened, the reaction product was separated from the catalyst layer, was washed, dried and subjected to fractional distillation. The cut boiling chiefly at 79–80° C. at 2.0 mm., comprising 2,2,3-trimethyl-3-chromene, was separated and recovered.

*Example III*

A mixture of 65 g. (0.53 mole) of salicylaldehyde, 41.5 g. (0.59 mole) of isoamylene and 32.8 g. of 85% phosphoric acid was heated for 5 hours at 90° C. in a glass liner in a rotating autoclave. After cooling to room temperature, the liner contents were withdrawn and the organic layer separated. The latter was freed of unreacted salicylaldehyde (55% recovered) by extra-action with aqueous sodium hydroxide then dried and distilled. The product, 2,2,3-trimethyl-3-chromene, boiling at 81° C. at 1.5 mm., was obtained in 24% yield (22 g.) based on the aldehyde charged.

*Example IV*

A mixture of 29.8 g. (0.24 mole) of salicylaldehyde and 17.0 g. (0.24 mole) of isoamylene along with 6.6 g. of a silica-alumina catalyst and 33 g. of n-heptane was placed in the glass liner of a rotating autoclave. The liner was placed in the autoclave which was then heated to a temperature of 150° C. for about 5 hours. At the end of this time the autoclave and contents thereof were cooled to room temperature. Upon completion of the cooling period the autoclave was opened and the reaction product layer separated from the catalyst layer. The former was washed, dried and subjected to fractional distillation, the cut boiling chiefly at 79–82° C. at 2.1 mm., comprising 2,2,3-trimethyl-3-chromene was separated and recovered therefrom.

*Example V*

To a mixture of 61.1 g. (0.50 mole) of salicylaldehyde and 7.2 g. of a phosphoric-fluoboric acid catalyst in an alkylating flask was added 53.0 g. (0.50 mole) of t-pentyl chloride during a 2 hour period during which time the temperature was chiefly 77–98° C. After an additional hour of stirring at 95° C., the reaction mixture was allowed to cool. The organic layer was separated and the unreacted salicylaldehyde extracted with dilute aqueous sodium hydroxide. The raffinate was dried and distilled yielding 15 g. (17%) of 2,2,3-trimethyl-3-chromene boiling chiefly at 81° C. at 2.4 mm.

The product, 2,2,3-trimethyl-3-chromene, was characterized as follows (after relistillation):

(1) Boiling point 79–80° C. at 2.1 mm. (242-244° C. corrected to 760 mm.), $n_D^{20}$ 1.5562. The chromene decolorized potassium permanganate solution, indicative of the presence of an olefinic linkage.

(2) The infrared spectrum was consistent with an ortho-disubstituted benzene ring containing an aryl alkyl ether group and there were indications of the presence of a tri-substituted olefinic bond.

(3) Ultraviolet analysis was in excellent agreement with the characteristic absorption bands in the published data on the isomeric 2,2,4-trimethyl-3-chromene [Baker, Floyd, McOmie, Pope, Weaving and Wild, J. Chem. Soc., 2010 (1956)].

(4) Molecular weight—Calcd.: 174. Found: (cryoscopic) 178; (mass spectroscopic) 174.

(5) *Analysis.*—Calcd. for $C_{12}H_{14}O$: C, 82.72, H, 8.09. Found: C, 82.81; H, 8.12.

*Example VI*

A mixture of 61.9 g. (0.51 mole) of salicylaldehyde and 127 g. (2.27 mole) of isobutylene along with 10.8 g. of a silica-alumina catalyst and 51.7 g. of n-heptane was placed in the glass liner of a rotating autoclave. The liner was sealed into said autoclave which was then heated to a temperature of about 150° C. and maintained thereat for a period of about 5 hours. At the end of this time the autoclave and contents thereof were cooled to room temperature, the autoclave was opened and the reaction product was separated from the catalyst layer. This product was then washed, dried and subjected to fractional distillation, the cut boiling at about 215–217° C. (corrected to 760 mm.) comprising 2,2-dimethyl-3-chromene being separated and recovered therefrom.

I claim as my invention:

1. A process which comprises condensing a salicylaldehyde of the formula

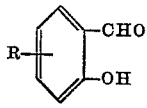

wherein R is selected from the group consisting of hydrogen, alkyl, alkoxy and halogen with an alkyating agent selected from the group consisting of olefins containing a tertiary carbon atom at the double bond of the olefin and tertiary alkyl halides in the presence of an acid-acting catalyst selected from the group consisting of silica-alumina, zinc chloride, zinc chloride-alumina, boron trifluoride-alumina, boron trifluoride-phosphoric acid complex, phosphoric acid and phosphoric-fluoroboric acid, and recovering the resultant chromene.

2. The process of claim 1 further characterized in that said alkylating agent is isoamylene.

3. The process of claim 1 further characterized in that said alkylating agent is isobutylene.

4. The process of claim 1 further characterized in that said alkylating agent is t-pentyl chloride.

5. The process of claim 1 further characterized in that said alkylating agent is t-pentyl bromide.

6. A process which comprises condensing salicylaldehyde with isoamylene in n-heptane in the presence of a zinc chloride-alumina catalyst at a temperature in the range of from about 125° to about 175° C., and recovering the resultant 2,2,3-trimethyl-3-chromene.

7. A process which comprises condensing salicylaldehyde with isobutylene in n-heptane in the presence of a silica-alumina catalyst at a temperature in the range of from about 125° to about 175° C., and recovering the resultant 2,2-dimethyl-3-chromene.

8. A process which comprises condensing salicylaldehyde with isoamylene in n-heptane in the presence of a silica-alumina catalyst at a temperature in the range of from about 125° to about 175° C., and recovering the resultant 2,2,3-trimethyl-3-chromene.

9. A process which comprises condensing salicylaldehyde with t-pentyl chloride in chloroform in the presence of fused zinc chloride at a temperature in the range of from about 65° to about 80° C., and recovering the resultant 2,2,3-trimethyl-3-chromene.

10. A process which comprises condensing salicylaldehyde with t-pentyl chloride in the presence of a phosphoric-fluoboric acid catalyst at a temperature in the range of from about 50° to about 125° C., and recovering the resultant 2,2,3-trimethyl-3-chromene.

References Cited in the file of this patent

Elderfield: Heterocyclic Compounds, vol. II, pp. 295–296, Wiley, New York (1951).